United States Patent [19]

Maruyama

[11] 4,047,316
[45] Sept. 13, 1977

[54] KNOTTED FISHING NET

[75] Inventor: Jiro Maruyama, Hakodate, Japan

[73] Assignee: Hakodate Seimo Sengu Co., Ltd., Japan

[21] Appl. No.: 642,759

[22] Filed: Dec. 22, 1975

[30] Foreign Application Priority Data

Dec. 27, 1974 Japan .................................... 50-518

[51] Int. Cl.² .......................................... A01K 74/00
[52] U.S. Cl. ............................................ 43/7; 87/12
[58] Field of Search ................. 43/7, 11; 87/12, 53; 289/1.2, 1.5, 3

[56] References Cited

U.S. PATENT DOCUMENTS 463,116   11/1891   Young .................................... 87/12

Primary Examiner—Louis G. Mancene
Assistant Examiner—Peter K. Skiff
Attorney, Agent, or Firm—Carroll F. Palmer

[57] ABSTRACT

A knotted fishing net wherein the knot is formed of a warp and a weft, said warp being wound at least one more time about the weft than in the prior art double knot; and the feed portion of the warp alternately passes over and below the return portion thereof at adjacent intersections except for the outermost intersection of both feed and return portions of the warp on the outlet side of a knot on which the return portion of the warp is drawn outward.

5 Claims, 40 Drawing Figures

FIG. 7a  FIG. 7b   FIG. 7c  FIG. 7d
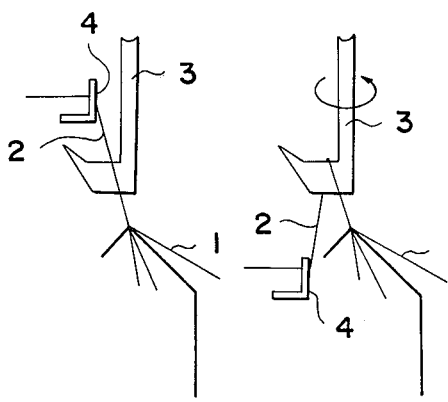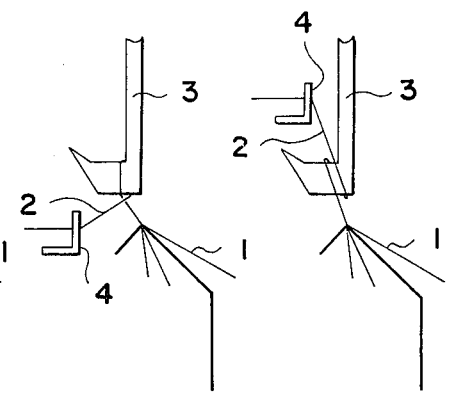
FIG. 7e     FIG. 7f     FIG. 7g
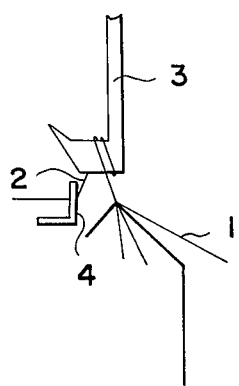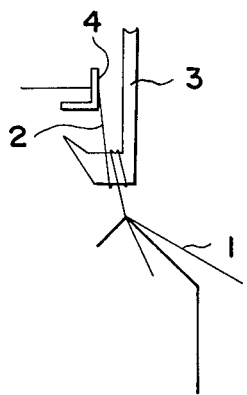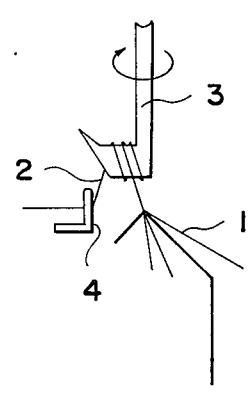
FIG. 7h     FIG. 7i
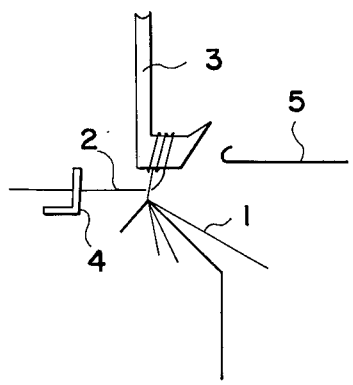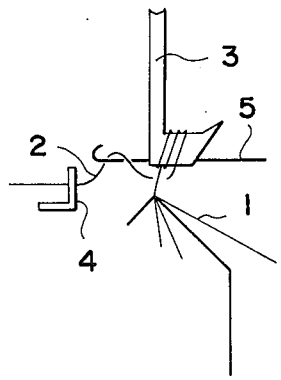

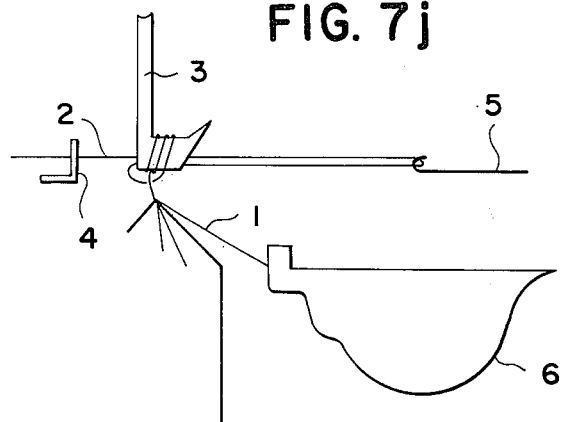
FIG. 7j
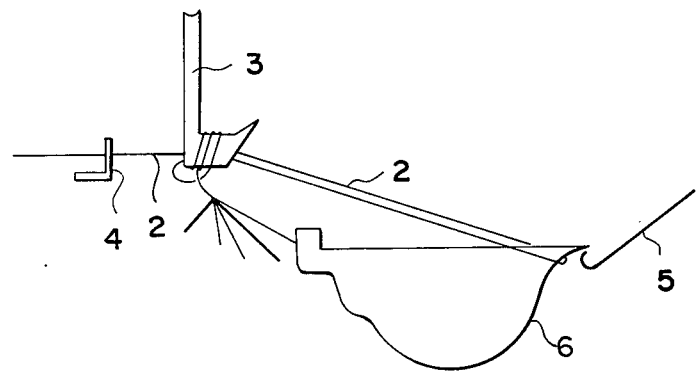
FIG. 7k
FIG. 7l
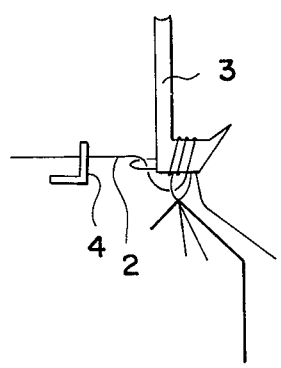
FIG. 7m
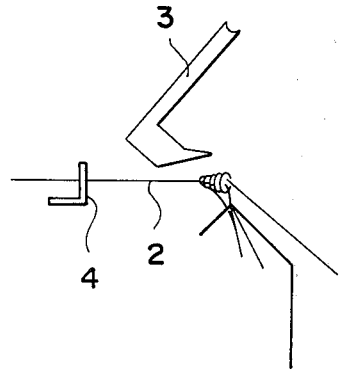

FIG.8g  FIG.8h  FIG.8i
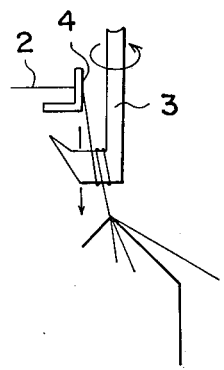
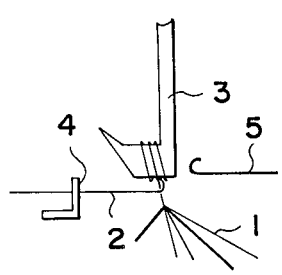
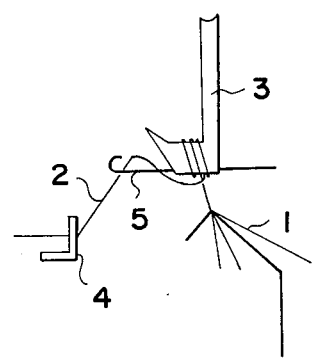
FIG.8j  FIG.9a  FIG.9b
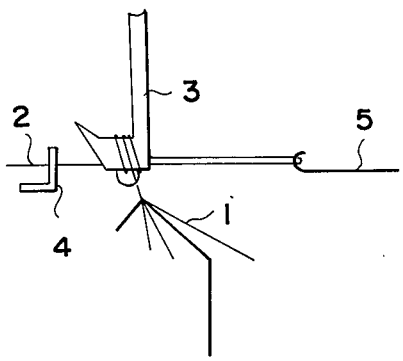
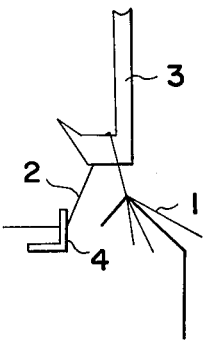
FIG.9c  FIG.9d  FIG.9e  FIG.9f
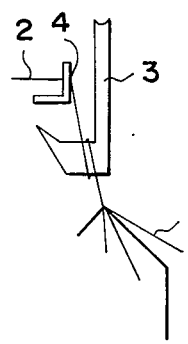
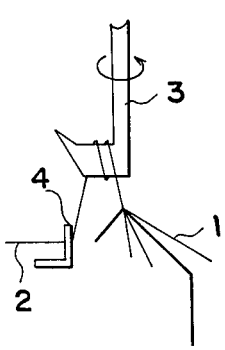
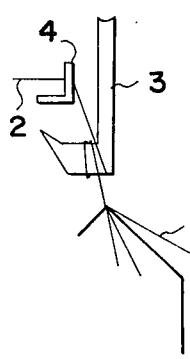
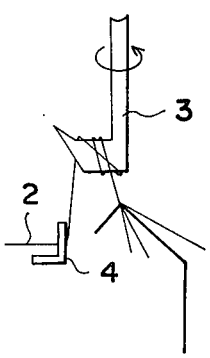

KNOTTED FISHING NET

This invention relates to a knotted fishing net and more particularly to improvements on the prior art double knot.

The known process of knitting a gill net has been carried out by a single or double knot. Customarily, however, the gill net is formed of warps and wefts of plastics monofilament having a smooth or slippery surface and high rigidity. Therefore, the knots are tightened relatively loosely, making it necessary to carry out, after fabrication of the gill net, an aftertreatment such as a knot-tightening treatment or surface treatment of said plastics warps and wefts with a different type of plastics material. However, the conventional fishing net threads had the drawbacks that even such aftertreatment failed to avoid the natural slip of a warp or weft constituting a knot or the deformation or overturn of a knot itself occurring when a warp or weft is forcefully pulled backward. To eliminate these difficulties, a variety of knotted fishing nets have hitherto been proposed whose knots were constructed in different ways. However, any of the proposed knotted fishing nets had the shortcomings that the knot construction was considerably intricate and an apparatus and process of providing a knotted fishing net also became complicated, resulting in low production efficiency and making repair work extremely difficult. These disadvantages rendered the prior art knotted fishing net unadapted for practical application. Further, complicated knot construction not only naturally increased consumption of fishing net threads, but also caused the knot itself to become large. With, for example, a gill net, such a bulky knot reduced catch and proved unacceptable due to fishes caught being physically damaged.

This invention has been accomplished in view of the above-mentioned circumstances and is intended to provide a novel double knot fishing net which more effectively prevents the slip of a warp or weft and the deformation or overturn of knots than the prior art double knot fishing net enables knots to be made relatively small, and can be fabricated, easily and efficiently without any specially designed net-knitting apparatus.

Namely, the knotted fishing net of this invention is characterized in that it comprises a weft used in the form of a capital letter "U" or a small letter "l" and a warp wound about the weft and drawn out of a knot after passing inside of the weft, and that the feed and return portions of the warp intersect each other at three points at least and the under-pass and over-pass of the feed portion of the warp relative to the return portion thereof are reversed at two adjacent intersections, except for the outermost intersection of both feed and return portions of the warp on the outlet side of a knot on which the return portion of the warp is drawn outward.

This invention can be more fully understood from the following detailed description when taken in conjunction with the accompanying drawings, in which.

FIGS. 7a to 7m, 8g, 8h, 8i, 8j, 9a to 9i and 10f, 10g, 10h and 10i schematically indicate the various processes of providing the knots of FIGS. 1a, 1b, 2a, 2b, 3a, 3b, 4a and 4b.

Figure 5:
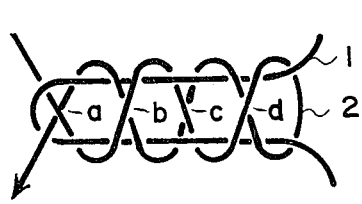
Figure 6:
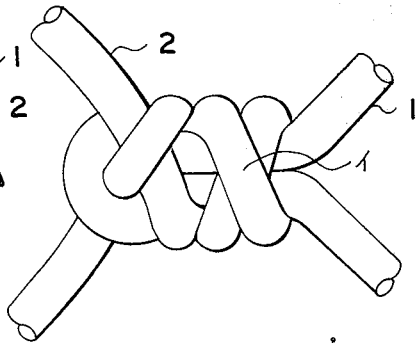
FIG. 6 is an enlarged view of the knot of FIG. 1a when tightened.

There will now be described the knotted fishing net of this invention by reference to the concrete modifications of a knot illustrated in the appended drawings. Referring to FIGS. 1a, 1b, 2a, 2b, 3a, 3b, 4a and 4b, a warp 2 is wound about weft 1. The feed and return portions of the warp 2 intersect each other at three points a, b, c, such that in FIG. 1a, for example, the feed portion 2A (shown in a double line) passes below the return portion 2B (shown in a solid line) at the intersection b and conversely passes over the return portion 2B at the intersection c, except for the outermost intersection a on the outlet side of a knot where the warp is drawn out therefrom. The same mode of passage takes place in FIGS. 1b, 2a and 2b. Conversely in FIGS. 3a, 3b, 4a and 4b, the feed portion 2A passes over the return portion 2B at the intersection b and passes below the return portion 2B at the intersection c. In the intersection of FIGS. 1a, 2a, 3a and 4a, the weft 1 is tightened to the warp 2 in the U-shape as illustrated, whereas in FIGS. 2b, 3b and 4b, the weft 1 is fastened to the warp 2 after being twisted once substantially in the form of a small letter l. FIG. 6 sets forth in enlargement the knot of FIG. 1a in which both weft 1 and warp 2 are tightened together. FIG. 5 shows a knot in which the warp 2 is wound about the weft 1 one more time than in the preceding modifications, and the feed portion 2A of the warp 2 intersects the return portion 2B thereof at the intersections b, c, d with the alternately reversed mode of passage. Throughout FIGS. 1 to 5, the warp 2 is drawn out of the knot after passing inside of the weft 1.

There will now be described by reference to FIGS. 7 to 10 the sequential steps of forming the knotted fishing net of this invention.

Figure 1A:
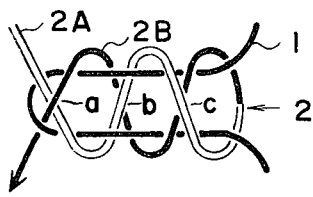
FIGS. 1a, 1b, 2a, 2b, 3a, 3b, 4a, 4b and 5 illustrate different concrete knot modifications of a knotted fishing net according to this invention.
Figure 1B:
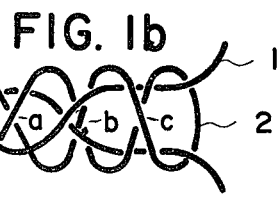
Figure 2A:
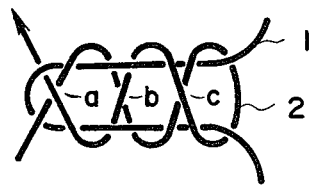
Figure 2B:
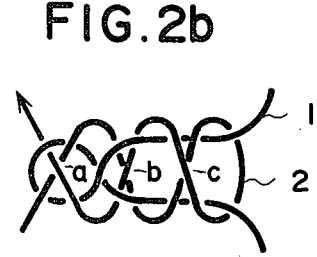

The knot of FIG. 1a is fastened through the steps of FIGS. 7a to 7j. In FIG. 7a, a warp 2 passing through a reed 4 is caught by an upper hook 3 when the reed is partly rotated counterclockwise about the upper hook 3. The upper hook 3 is fully rotated counterclockwise in a horizontal plane as indicated by the arrow of FIG. 7b, resulting in the condition of FIG. 7c. Thereafter, as shown in FIGS. 7d to 7g, the reed 4 is rotated twice counterclockwise about the upper hook 3. The upper hook 3 is half rotated counterclockwise in a horizontal plane as shown in FIG. 7g, bringing about the condition of FIG. 7h. In FIG. 7h, a lower hook 5 is carried toward the upper hook 3 and then let to pass through a groove (not shown) formed in the lower part of the upper hook 3, thereby causing the warp 2 to be caught by the lower hook 5 from the underside thereof as illustrated in FIG. 7i. The forward end portion of the warp 2 is drawn out of the upper hook 3 by the lower hook 5 through the lower groove thereof as shown in FIG. 7j. Thereafter, the warp 2 is let to pass over a shuttle 6 indicated in FIG. 7k to be released from the lower hook 5. Then, the warp 2 is drawn backward to pull the weft 1 into the groove at the lower part of the upper hook 3. The upper hook 3 is rotated counterclockwise in a vertical plane to release the weft 1 and warp 2. Thereafter the weft 1 and warp 2 are tightly fastened together, as shown in FIG. 7m. The steps of FIG. 7a to FIG. 7m are repeated to provide a knotted fishing net formed of the knots of FIG. 1a. The modification of FIG. 1b is formed by causing the lower hook 5 to catch the warp 2 from the opposite side to FIG. 7i. The other steps corresponding to FIGS. 7a to 7h and 7j to 7m are carried out in the same manner. The modification of FIG. 2a is obtained by carrying out the same steps as those of FIGS. 7a to 7f; thereafter rotating the upper hook 3 counterclockwise in a horizontal plane; pushing forward the lower hook 5 to let it pass through a groove (not shown) formed in the lower part of the upper hook 3 as shown in FIG. 8h; pulling backward the lower hook 5 with the warp 2 caught thereby as shown in FIG. 8i; and subsequently taking the same steps as those of FIGS. 7k to 7m. The modification of FIG. 2b is provided by causing the lower hook 5 to catch the warp 2 from the opposite side to FIG. 8i and subsequently taking the same steps as in the case of FIG. 2a.

Figure 3A:
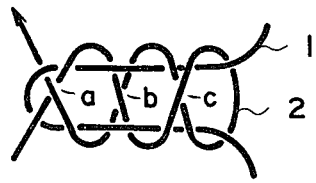
Figure 3B:
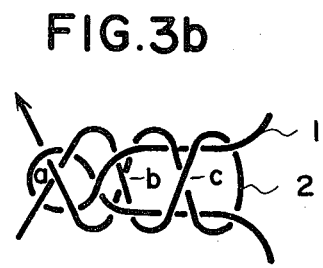

For the production of the modification of FIG. 3a, the reed 4 is rotated counterclockwise about the upper hook 3 to wind the warp 2 passing through the reed 4 twice about the upper hook 3, as shown in FIGS. 9a to 9d. The upper hook 3 is rotated once counterclockwise in a vertical plane as illustrated in FIG. 9d to wind the warp 2 once counterclockwise about the upper hook 3. The upper hook 3 is rotated once counterclockwise. The lower hook 5 is carried forward to pass through the groove (not shown) formed in the lower part of the upper hook 3 to catch the warp 2. The warp 2 is pulled toward the shuttle 6, while being caught by the lower hook 5. The subsequent steps are taken in the same manner as those of FIGS. 7k to 7m. The modification of FIG. 3b is formed by causing the lower hook 5 to catch the warp 2 from the opposite side to FIG. 9h and subsequently taking the same steps as in the case of the modification of FIG. 3a.

Figure 4A:
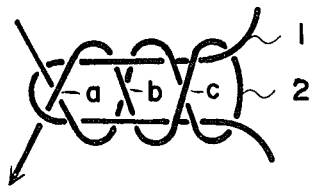
Figure 4B:
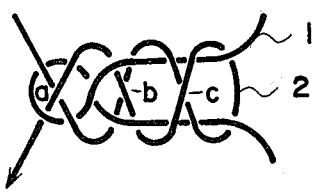
Figure 9G:
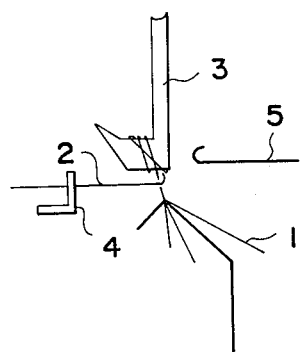
Figure 10F:
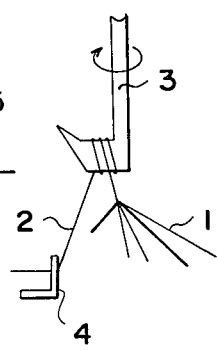
Figure 10G:
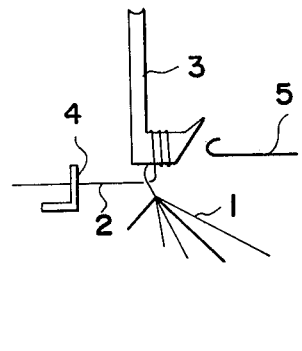
Figure 10H:
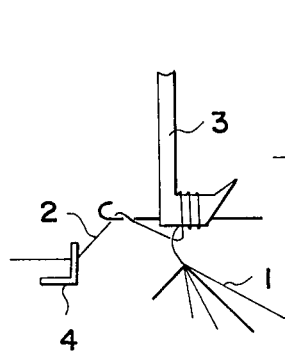
Figure 10I:
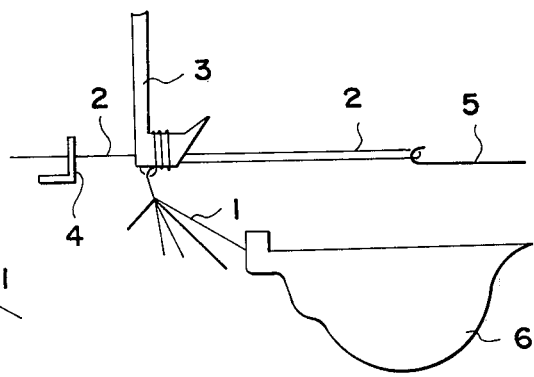

The modification of FIG. 4a is produced by taking the steps corresponding to FIGS. 9a to 9e; half rotating the upper hook 3 clockwise in a horizontal plane as shown by the arrow of FIG. 10f; carrying forward the lower hook 5 to catch the warp 2 as shown in FIG. 10h; pulling the warp 2 over the shuttle 6 as illustrated in FIG. 10i; and subsequently taking the same steps as those of FIGS. 7k to 7m. The modification of FIG. 4b is obtained by causing the lower hook 5 to catch the warp 2 from the opposite side to FIG. 10h and taking subsequent steps in the same manner as in the case of the modification of FIG. 4a.

Figure 9H:
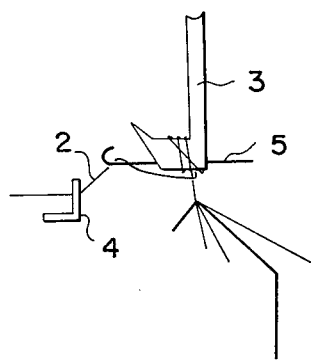
Figure 9I:
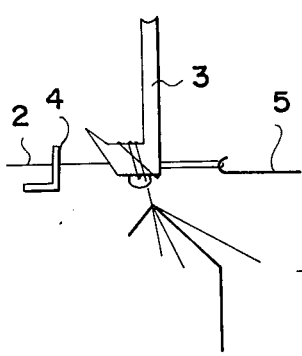

The modification of FIG. 5 is obtained by repeating twice the series of steps shown in FIGS. 9a to 9d and subsequently taking the same steps as those of FIGS. 9g to 9i. Where the feed and return portions of the warp 2 are desired to intersect each other at an increased number of points, then it is advised to repeat the steps of FIGS. 9a to 9d or FIGS. 7a to 7c.

The foregoing description of the embodiment of this invention refers to the case where the warp 2 was thrown on the upper hook 3 from the right side as shown in FIG. 7a and wound similarly counterclockwise about the upper hook 3 as illustrated in FIGS. 7d to 7f. However, the knots of FIGS. 1a and 1b can be formed by reversing the direction in which the warp 2 is wound about the upper hook 3. The same applies to the modifications of FIGS. 2a, 2b, 3a, 3b, 4a, 4b, FIG. 5 and any other modifications of this invention.

With the knotted fishing net of this invention, the feed and return portions of a warp intersect each other at three points at least.

In this case, the feed portion of a warp 2 passes, as mentioned above, below the return portion thereof at the second intersection and conversely over said return portion at the third intersection, except for the first or outermost intersection on the outlet side of a knot on which the warp 2 is drawn outward. Consequently, these intersections are fastened together tight, thereby causing the weft 1 to be more firmly tightened to the warp 2 when the warp 2 happens to the pulled during application. Namely, the knot of this invention positively tends to be rather tightened than loosened. Therefore, a fishing net formed of such knots is saved from the loosening of the constituent threads of knots and the deformation or overturn thereof when the warp or weft is inadvertently pulled apart. This outstanding feature of this invention allows relatively small knots to be used in forming a fishing net and appreciably reduces the consumption of net threads. Therefore, the fishing net manufactured by the method of this invention is saved from decline in catch and the possible physical damage of fishes caught. Further advantage of the invention is, for example, that the simple construction of a knot reduces the cost of manufacture and repair.

Data given in the following Table 1 denote the results of comparison between the mechanical properties of the knotted fishing net of this invention, the prior art fishing net formed of a double knot and a triple knot fishing net purposely provided for comparison in which the feed and return portions of the warp intersect each other at three points and the feed portion passes below or over the return portion alike at said three intersections. This physical property test was carried out by the method customarily applied in determining the physical properties of a fishing net. The three types of fishing net were formed of nylon monofilament of 1,870 deniers. The test was carried out on 10 samples of each of said three types under the conditions in which the samples were immersed 24 hours in water at 21° C, and stretched at a speed of 20 cm/min in relative humidity of 60%. Numerals given in Table 1 respectively represent a mean of measured values.

Table 1

| Sample Item of test | Physical Property Test | | |
| --- | --- | --- | --- |
| | Prior art knot (D/K) | Triple knot (D/K) | Knot of this invention (U/K) |
| Knot-breaking force (kg) Wet | 11.3 | 11.5 | 12.0 |
| Knot extensibility (%) Wet | 23.5 | 23.8 | 23.2 |
| Knot-deforming force (kg) Wet | 9.1 | 10.2 | 12.0 |
| Percentage knot deformation * (%) Wet | 80.5 | 88.7 | 100 |
| Measured knot length (m/m) Wet | 130 | 130 | 130 |

* $\frac{\text{Knot-deforming force}}{\text{Knot-breaking force}} \times 100$

What is claimed is:

1. A knotted fishing net wherein the knot is formed of a U-shaped weft, and a warp wound about the weft and drawn out of the knot after passing inside of said shaped weft with the feed and return portions of the warp being wound in opposite directions around said shaped weft in a direction away from the free ends of said shaped weft such that said feed and return portions intersect each other on at least three points and the under-pass and over-pass of the feed portion of the warp relative to the return portion thereof are reversed at two adjacent intersections exclusive of the outermost intersection on the outlet side of the knot on which the warp is drawn outward.

2. A knotted fishing net according to claim 1, wherein the feed and return portions of the warp intersect each other at three points.

3. A knotted fishing net according to claim 1, wherein the weft and warp are formed of plastics monofilament.

4. A knotted fishing net according to claim 1 wherein said weft and warp are formed of plastics monofilament, said knot comprises a U-shaped weft, the warp feed and return portions intersect each other at three points, namely, said outermost intersection, an innermost intersection on the inside of the knot where the weft is drawn outward and a middle intersection, the feed portion of the warp lying between the weft and the return portion of the warp at said outermost and middle intersections and the feed portion of the warp lying outside the return portion at said innermost intersection.

5. A knotted fishing net wherein the knot is formed of an L-shaped weft and a warp wound about the weft and drawn out of the knot after passing inside of said shaped weft with the feed and return portions of the warp being wound in opposite directions around said shaped weft in a direction away from the free ends of said shaped weft such that said feed and return portions intersect each other on at least three points and the under-pass and over-pass of the feed portion of the warp relative to the return portion thereof are reversed at two adjacent intersections exclusive of the outermost intersection on the outlet side of the knot on which the warp is drawn outward.

* * * * *